US008264583B2

(12) United States Patent
Yamaji et al.

(10) Patent No.: US 8,264,583 B2
(45) Date of Patent: Sep. 11, 2012

(54) INFORMATION PROCESSING APPARATUS, METHOD AND COMPUTER PROGRAM PRODUCT

(75) Inventors: Kei Yamaji, Kanagawa (JP); Kazuhiro Mino, Kanagawa (JP); Naoaki Hatano, Kanagawa (JP); Hiromichi Watanabe, Kanagawa (JP); Shinji Chiba, Kanagawa (JP); Hisashi Ohara, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 326 days.

(21) Appl. No.: 12/553,746

(22) Filed: Sep. 3, 2009

(65) Prior Publication Data

US 2010/0053364 A1 Mar. 4, 2010

(30) Foreign Application Priority Data

Sep. 3, 2008 (JP) ................................. 2008-226216

(51) Int. Cl.
*H04N 5/222* (2006.01)
(52) U.S. Cl. ................................. 348/333.02
(58) Field of Classification Search ............... 348/222.1, 348/333.01, 333.02, 240.99, 240.2
See application file for complete search history.

(56) References Cited

U.S. PATENT DOCUMENTS

| 7,317,485 | B1 * | 1/2008 | Miyake et al. | 348/333.02 |
| 7,397,500 | B2 * | 7/2008 | Yost et al. | 348/208.99 |
| 7,668,454 | B2 * | 2/2010 | Battles et al. | 396/281 |
| 2005/0030388 | A1 * | 2/2005 | Stavely et al. | 348/222.1 |
| 2006/0103731 | A1 * | 5/2006 | Pilu et al. | 348/207.99 |
| 2008/0211928 | A1 | 9/2008 | Isomura et al. | |

FOREIGN PATENT DOCUMENTS

| JP | 2000-138858 | 5/2000 |
| JP | 2006-086823 | 3/2006 |
| JP | 2006-287911 | 10/2006 |

\* cited by examiner

*Primary Examiner* — Timothy J Henn
(74) *Attorney, Agent, or Firm* — Young & Thompson

(57) ABSTRACT

This invention enables an intention of a photographer to be reflected with greater accuracy in image processing based on actions performed by the photographer when taking an image. Based on user information acquired by a user information acquisition section, supplementary information such as whether a composition flag is on or off and assignment of an image classification is recorded with an image. Based on the supplementary information, various types of image processing such as setting an image trimming range, imparting an effect, and arranging an image on a mount are performed.

12 Claims, 15 Drawing Sheets

FIG.10

| NO | NORMAL PRINT | PHOTO ALBUM OR THE LIKE | MOVING IMAGE PLAYBACK |
|---|---|---|---|
| S15 | PERFORM CENTERING IN ACCORDANCE WITH ASPECT RATIO OF PRINT SIZE AND CUT OUT TOP, BOTTOM, RIGHT AND LEFT | CUT OUT FREELY AS NECESSARY, AND SUPERPOSITION OF IMAGES CAN BE EXECUTED | CUT OUT FREELY AS NECESSARY, AND SUPERPOSITION OF IMAGES CAN BE EXECUTED |
| S13 | CUT OUT WHILE TAKING POINT OF INTEREST INTO CONSIDERATION<br><br>ALSO TAKE POSITION FOR SYNTHESIZING CHARACTERS SUCH AS DATE INTO CONSIDERATION | CUT OUT A/B RESPECTIVELY<br><br>SYNTHESIS OF OTHER IMAGE ON PORTION THAT IS NOT PORTION OF INTEREST, AND THE LIKE | PAN FROM A TO B, CUT OUT, OR ZOOM<br><br>SYNTHESIS OF OTHER IMAGE ON PORTION THAT IS NOT PORTION OF INTEREST, AND THE LIKE |
| S14 | DISPLAY WARNING WHEN LARGE-SCALE CUT OUT OCCURS | PRINT IMAGE AS IS WITHOUT PERFORMING SPECIAL PROCESSING SUCH AS CLIPPING AND SYNTHESIZING<br><br>UTILIZATION FOR PORTION OF INTEREST: COVER SHEET/TWO-FACING PAGES AND THE LIKE | PLAYBACK IMAGE AS IS WITHOUT PERFORMING SPECIAL PROCESSING SUCH AS CLIPPING AND SYNTHESIZING<br><br>UTILIZATION FOR PORTION OF INTEREST: SIMULTANEOUS DISPLAY IS NOT PERFORMED AT INTERVALS OF MULTIPLE CLIMAX PORTIONS OF BGM AND THE LIKE |

FIG.12

| NO | TIME INTERVAL UNTIL IMAGING | ACQUISITION OF CAMERA MOTION | DESCRIPTION | CLASSIFICATION |
|---|---|---|---|---|
| 1 | LONG | CAMERA IS SET UP AT FIXED POSITION | TIME IS TAKEN TO DECIDE COMPOSITION<br><br>NOT ONLY THE SUBJECT, BUT ALSO THE BALANCE WITH THE BACKGROUND IS IMPORTANT | A |
| 2 | SHORT | SHUTTER BUTTON IS PRESSED STRONGLY<br><br>SHUTTER BUTTON IS PRESSED IN FAST MANNER<br><br>SETTING UP OF CAMERA IS FAST<br><br>MULTIPLE IMAGES ARE TAKEN IN SUCCESSION | A DISTINCTIVE EVENT OCCURS AND, AT ANY RATE, IT IS DESIRED TO TAKE AN IMAGE QUICKLY | B |
| 3 | OTHER | IMAGE IS TAKEN AS SOON AS CAMERA IS SET UP<br><br>ALTHOUGH ADJUSTMENT IS PERFORMED TAKING LESS TIME THAN IN No. 1, PREPARATION IS NOT AS HASTY AS IN No. 2 | AN IMAGE IS CASUALLY TAKEN | C |

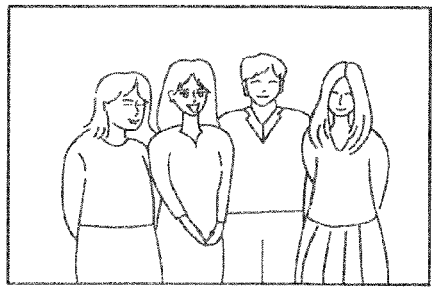
FIG.14A
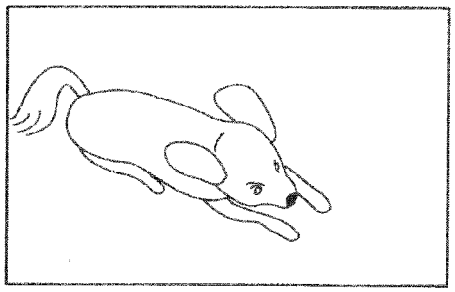
FIG.14B
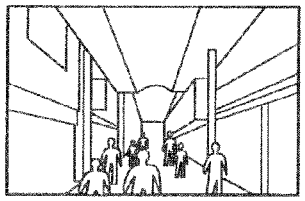
FIG.14C
FIG.14D	FIG.14E
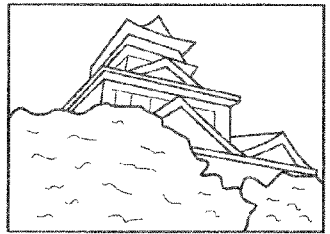 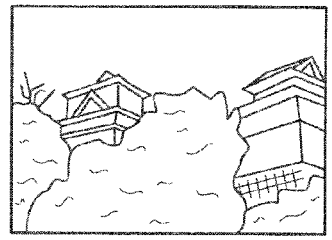

INFORMATION PROCESSING APPARATUS, METHOD AND COMPUTER PROGRAM PRODUCT

BACKGROUND OF THE INVENTION

1. Field of the Invention

The present invention relates to an apparatus, method, and program that decide various image processing contents in accordance with actions performed by a photographer before taking an image.

2. Description of the Related Art

Japanese Patent Application Laid-Open No. 2006-86823 relates to an image recording device that includes an environmental information detection part. The image recording device records information such as the ambient temperature, humidity, and air pressure, as well as camera vibrations, a shutter button pressing force, and the body temperature, pulse, and blood pressure of the photographer and the like when taking an image. Based on this information, appraisal or retrieval of an image is performed.

According to Japanese Patent Application Laid-Open No. 2000-138858, the movement of a hand or finger of a photographer is detected, and control for starting image taking, zooming, recording, and playback is performed based thereon.

An image output system according to Japanese Patent Application Laid-Open No. 2006-287911 includes a level of importance calculation section that calculates the level of importance of an image, and an output control section that causes an image for which the level of importance calculated by the level of importance calculation section is large to be displayed or printed in a larger size. When trimming and outputting a captured image for which a change amount in a recorded angle of view is greater than a prescribed change amount, an output device restricts a trimming range set by a user so that a trimmed image obtained by trimming the relevant captured image is greater than or equal to a predetermined size. It is thereby possible to prevent a captured image that the user intentionally imaged using a wide angle from being trimmed to a smaller image than is required.

SUMMARY OF THE INVENTION

According to the device disclosed in Japanese Patent Application Laid-Open No. 2006-86823, although an image is assessed, image processing of contents that are in accordance with the assessment is not performed. According to Japanese Patent Application Laid-Open No. 2000-138858, although the movements of a photographer are acquired, image processing of contents that are in accordance with the movements is not performed.

Although related art that attempts to reflect conditions that exist when taking an image in trimming conditions already exists as described in Japanese Patent Application Laid-Open No. 2006-287911, the system disclosed in Japanese Patent Application Laid-Open No. 2006-287911 merely prevents narrowing of a trimming range. Conversely, although there may also be images for which it is adequate to reduce a trimming range that includes a region of interest to the user, the system in question can not support such cases.

An object of the present invention is to enable the intention of a photographer to be reflected more accurately in image processing on the basis of actions performed by the photographer when taking an image.

An information processing apparatus according to the present invention comprises a photographer information acquisition section which acquires photographer information that is information relating to actions of a photographer before starting to take an image, and a processing contents decision section which decides contents of processing with respect to the image based on photographer information that is acquired by the photographer information acquisition section; wherein the photographer information includes at least one member of the group comprising whether to perform a composition confirmation, whether to perform an imaging preparation operation, a position of an imaging device, an elapsed time until starting to take an image, and a movement of an imaging device until starting to take an image.

When the photographer information includes information indicating that a composition confirmation has been performed, the processing contents decision section sets an image processing range of a predetermined aspect ratio based on a predetermined position in the image. When the photographer information includes information indicating that a composition confirmation has not been performed, the processing contents decision section sets an image processing range of a predetermined aspect ratio based on the main subject in an image.

The image processing range includes a trimming range or an image synthesis range.

The information processing apparatus according to the present invention further comprises a failed image determination section which determines whether or not an image is an image with respect to which imaging failed, wherein in a case where the photographer information includes information indicating that a composition confirmation is performed and the failed image determination section determines that the image is a failed image, the processing contents decision section excludes the image from candidates for which processing contents are decided.

Information indicating that a composition confirmation has been performed includes detection of an eye line to a display screen of an imaging device, detection of a human body in the vicinity of the imaging device, audio recognition of specific contents, a specific posture of the imaging device, and detection of an operation to input an imaging condition, such as a zoom operation, a focus operation, or a brightness adjustment operation.

The information processing apparatus according to the present invention further comprises a portion of interest decision section which decides a portion of interest of an image, wherein the processing contents decision section decides the contents of processing with respect to the image based on a portion of interest of the image that is decided by the portion of interest decision section.

The information processing apparatus according to the present invention further comprises a portion of interest designation section which accepts a designation of a portion of interest of an image, wherein the processing contents decision section decides contents of processing with respect to the image based on a portion of interest of an image for which a designation is accepted by the portion of interest designation section.

The portion of interest decision section decides as a portion of interest at least one of a focused subject and a subject that is at the same distance as a distance to the focused subject from the imaging device.

The information processing apparatus according to the present invention further comprises a subject of interest identification section which identifies a subject to which the photographer is paying attention, wherein the portion of interest decision section decides that a subject identified by the subject of interest identification section is a portion of interest.

The information processing apparatus according to the present invention further comprises a classification section which assigns a classification to an image based on photographer information acquired by the photographer information acquisition section, wherein the processing contents decision section decides contents of processing with respect to the image based on a classification that is assigned to the image by the classification section.

The information processing apparatus according to the present invention further comprises a processing section which processes the image in accordance with processing contents that are decided by the processing contents decision section.

The processing includes at least one of trimming, arranging an image on a mount, synthesizing images, and imparting an effect to an image.

An information processing method according to the present invention includes a step of a computer acquiring photographer information that is information relating to actions of a photographer before starting to take an image, and a step of a computer deciding contents of processing with respect to the image based on photographer information that is acquired by the photographer information acquisition section; wherein the photographer information includes at least one member of the group comprising whether to perform a composition confirmation, whether to perform an imaging preparation operation, a position of an imaging device, an elapsed time until starting to take an image, and movement of an imaging device until starting to take an image.

A computer program product stored on a computer readable medium, the product comprising computer-executable instructions for causing a computer to execute the information processing method is also included in the present invention.

According to the present invention, a level of importance or a point of interest of an image supposed by a photographer can be ascertained based on whether to perform a composition confirmation, whether to perform an imaging preparation operation, a position of the imaging device, an elapsed time until starting to take an image, and movement of the imaging device until starting to take an image, and appropriate image processing can be performed in accordance therewith.

BRIEF DESCRIPTION OF THE DRAWINGS

FIG. 10 shows an example of a processing contents table;
FIG. 12 shows an example of a classification table;
FIGS. 14A, 14B, 14C, 14D and 14E are views that show examples of captured images.

DETAILED DESCRIPTION OF THE PREFERRED EMBODIMENTS

<First Embodiment>

Figure 1:
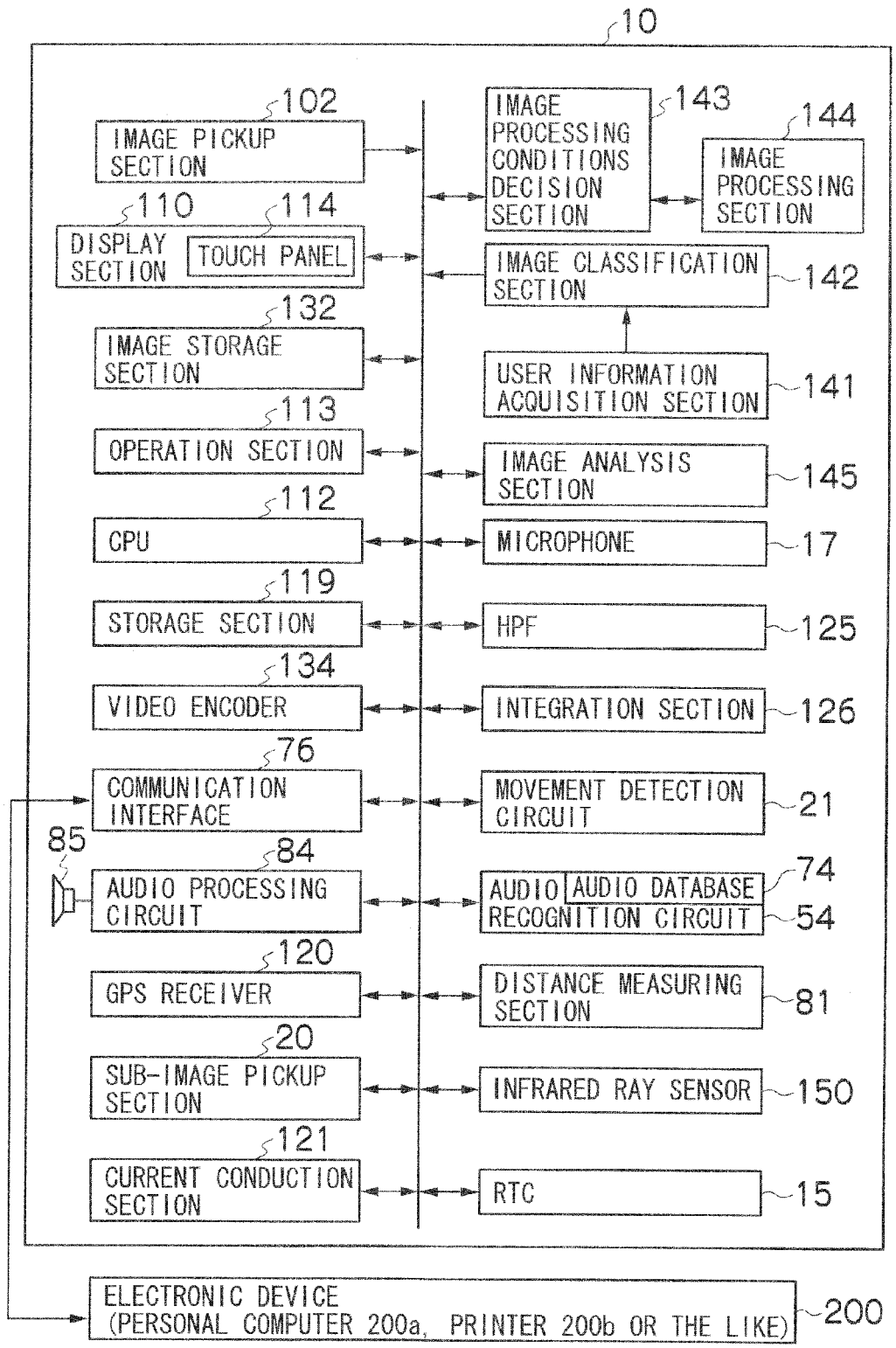
FIG. 1 is a functional block diagram of a digital camera.

FIG. 1 is a functional block diagram of a digital camera 10 according to a preferred embodiment of the present invention. First, in a digital camera 10 shown in FIG. 1, a central processing unit (CPU) 112 performs centralized control of each circuit inside the digital camera 10 based on inputs from various buttons or keys of an operation section 113 that includes a release switch, a mode dial and the like. A program executed by the CPU 112 is stored in a ROM of a storage section 119.

An image pickup section 102 includes an image pickup lens including a zoom lens and a focal lens, a motor that drives the image pickup lens, a motor driver that drives the motor in accordance with commands from the CPU 112, and a solid-state image pickup device that receives light of a subject image that is formed by the image pickup lens, subjects the light to photoelectric conversion, and outputs the result as an analog image signal.

When a still image imaging mode is set by the mode dial, the CPU 112 displays frame images (live view images) that are sequentially obtained from the image pickup section 102 on a display section 110 to enable confirmation of the imaging angle of view.

The image pickup section 102 includes an image processing device that includes an A/D converter, a gain control circuit, an image signal processing circuit, a white balance correction circuit, a gamma correction circuit, a YC processing circuit, a brightness and color difference signal generation circuit, a sharpness correction circuit, a contrast correction circuit, a contour processing section that performs image processing including contour correction for captured images, and a noise reduction processing section that performs noise reduction processing for an image, and processes an image signal in accordance with a command from the CPU 112, to convert the image signal to digital image data.

Image data output from the image pickup section 102 is converted to a brightness signal (Y signal) and a color difference signal (Cr, Cl signal), and after undergoing predetermined processing such as gamma correction, is stored in a VRAM of the storage section 119.

Only G pixel components are extracted from the image data at a high pass filter (HPF) 125. Subsequently, the extracted G pixel components undergo integration processing at an integration section 126, and the data is sent to the CPU 112. The CPU 112 calculates a mean value of areas (for example, four areas) in the vicinity of the center of a subject arbitrarily set using cross keys from among image data of a divided region (for example, region divided into 64 parts) of one screen amount that is sent from the integration section 126, and adopts this as an autofocus (AF) evaluation value.

The AF evaluation value is calculated each time a predetermined period elapses, and is updated and stored in the storage section 119 after each calculation. The CPU 112 determines a lens position that focuses on the subject in accordance with the AF evaluation value. Although the method of determination is arbitrary, for example, the CPU 112 determines whether or not the AF evaluation value arrives approximately in the neighborhood of the local maximum point, and determines that a case in which the AF evaluation value approximately reaches the local maximum point is one in which the lens position is in focus, and determines other cases as not being in focus (contrast AF). Alternatively, the CPU 112 can also determine that a lens position is in focus if the AF evaluation value exceeds a predetermined threshold value.

When outputting a captured image to a monitor of the display section 110, a YC signal is read out from the VRAM and sent to the video encoder 134. The video encoder 134 converts the received YC signal into a signal of a predetermined system for display (for example, a color composite video signal of the NTSC system), and outputs the converted signal to the display section 110.

YC signals of each frame that have been processed at a predetermined frame rate are sequentially written in the VRAM, and a video signal generated from the YC signal is supplied to the display section 110, to thereby display a video image that is being imaged on the display section 110 in real time. The user can confirm the imaging angle of view using the video image (live view image) this is displayed on the display section 110.

In this case, when the release switch is half-pressed, AE and AF processing is started. When AE/AF processing is performed and the release switch is fully pressed, an imaging operation for recording starts. Image data for recording that is obtained in response to the release switch being fully pressed is stored in the image storage section 132.

After Y/C signals stored in the image storage section 132 are compressed according to a predetermined format (for example, Exif (Exchangeable Image File Format)) by the CPU 112, the compressed signals are stored as a file on an external storage medium. An image is recorded in a data portion of the Exif file. The CPU 112 records information showing the imaging date and time and the like in a predetermined tag (image description tag or the like) of a header portion of the aforementioned Exif file. The recorded image can also be sent to various electronic devices 200 such as a personal computer 200a, a printer 200b, or a PDA that are connected via a communication interface 76.

The printer 200b prints still images that are received from the camera 10 or personal computer 200a with a predetermined layout on a mount composed by a paper medium such as plain paper or photographic printing paper. The still images that are arranged with a predetermined layout can also be output to a display as electronic media such as a "PDF" of Adobe Systems Incorporated, or recording media, or to a personal computer that is connected to via the Internet or the like. In short, the output destination of a created image print is not limited to a specific output destination. According to the present specification, a creation form of an electronic medium in which a desired image can be arranged in a desired position is also referred to as a "mount".

When a moving imaging mode is set by the mode dial, a moving image recording operation starts in response to an operation that fully depresses the release switch. When the release switch is depressed once more, the moving image recording operation stops. A configuration may also be adopted in which an image recording operation is performed during a period in which the release switch continues to be depressed, and the recording stops when the depression of the release switch is released. The moving image data is recorded in the image storage section 132 using, for example, the MPEG 4 format.

When a playback mode is selected by the mode dial, compression data of the last image file (the file that was last recorded) that is stored in the image storage section is read out. The image compression data that is read out is expanded into decompressed YC signals by the CPU 112 and applied to the video encoder 134. The video encoder 134 creates an RGB color composite video signal according to the NTSC system from the input YC signals, and outputs the thus-created video signal to the display section 110. Thus, an image is displayed on the display section 110.

The display section 110 corresponds to an LCD or a finder that is built into the camera 10 or to an external display device that is connected to a video output terminal or the like. In this connection, the CPU 112 includes an OSD signal generation circuit. The OSD signal generation circuit generates signals for displaying symbols such as characters and icons to indicate a shutter speed or f number, the number of images that can be captured, the imaging date and time, and a warning indication and the like. Where necessary, a signal output from the OSD signal generation circuit is mixed with an image signal and supplied to the display section 110. Thereby, a synthesized image in which a character or icon is synthesized with a live view image or a playback image is displayed.

The image storage section 132 is a device which retains image data (still images, moving images) obtained by imaging. For example, a memory card referred to as "smart media" is used as the image storage section 132. The form of the recording media is not limited thereto, and the recording media may be a PC card, a compact flash (registered trademark), a magnetic disk, an optical disk, a magneto-optic disk, a memory stick or the like. It is also possible to use a medium that can be read according to an electronic, magnetic, or optical system, or a system that combines any of these systems. A configuration may also be adopted in which a plurality of recording media can be mounted, irrespective of whether the recording media are of different types or of the same type. Further, a device that stores an image file is not limited to a removable medium that is detachable from the camera main unit, and may be a recording medium (built-in memory) that is built into the camera.

The CPU 112 is a control circuit that performs centralized control of each circuit of the camera 10. The CPU 112 controls operations of a corresponding circuit based on a signal received from the operation section 113 that includes the release switch, cross keys, a power switch, the mode dial, an information position specification key or an unshown flash button, zoom key, menu/execute button and the like. The CPU 112 also performs display control with respect to the display section 110, flash emission control, AF auxiliary light emission control, autofocus (AF) control, and auto exposure (AE) control and the like.

Each time the power of the camera 10 is turned on by the power switch, power is supplied to each circuit of the digital camera 10 from an unshown main power source comprising a battery that is mounted inside the camera body.

The communication interface 76 is capable of connecting with various information processing devices such as a personal computer or a printer, and sends and receives data according to commands from the CPU 112.

A movement detection circuit 21 comprises an acceleration sensor, a potentiometer, a gravity sensor, an inclination sensor, a posture sensor, an electronic compass and the like. More specifically, the movement detection circuit 21 includes the operation section 113, a pressure detection section which, in particular, detects a pressing force on the release switch, a left-right movement detection section which outputs left-right movement information that shows a direction of movement to the left or right of the camera 10 as well as the amount of movement, a vertical movement detection section which outputs vertical movement information that shows the direction of an upward or downward movement of the camera 10 as well as the amount of movement, and an inclined movement detection section which outputs inclined movement information that shows a direction of inclination with respect to the horizontal direction of the outer casing of the camera 10 as well as the amount of inclination. The movement information includes left-right movement information, vertical movement information, and inclined movement information, as well as information indicating a time that detection of each movement started, a time that detection of each movement ended, and the period of time in which detection of each movement continued.

A sub-image pickup section 20 is provided on the front face of the outer case of the camera 10 and performs imaging of the photographer itself (hereunder, referred to as "self-imaging"), and is thus different to the image pickup section 102 which is provided on the front face of the outer case of the camera 10 and is used for taking images of a subject. Further, the sub-image pickup section 20 detects the location on the screen of the display section 110 at which the user is gazing, and inputs the detected information to the CPU 112. To detect the direction of an eye under test, a light beam is projected at an anterior ocular segment of the eye to be tested, and an image reflected by the cornea or a crystalline lens is detected by means of a photoelectric conversion element. A device which detects the direction of an eye under test is known and, for example, technology disclosed in Japanese Patent No. 2872292 can be applied.

As a distance measuring section 81, for example, a triangular distance measuring sensor can be employed which emits light from a light emission section towards a subject that is in an imaging range of the image pickup section 102, receives light that is reflected and returned by the subject, and calculates a distance to the subject based on an angle formed by the light emission section and a light receiving section. Alternatively, various publicly known technologies can be employed as long as they can measure a distance to a subject, such as a sensor that applies a TOF (time-of-flight) principle or a method that utilizes a distance image (3D image) of a compound-eye camera.

A touch panel 114 is laminated onto the display section 110. When the user pushes down a corresponding portion of the display section 110 with a finger or a pen or the like, information indicating the pushed down portion is output to the CPU 112.

A speaker 85 is connected via an audio processing circuit 84 to the CPU 112. By driving the speaker 85 based on notification sound data (shutter sound, warning sound, and the like) that is sent from the CPU 112, the audio processing circuit 84 outputs a notification sound or a sound that has been recorded together with a moving image.

In the case of the moving imaging mode, an analog audio signal obtained from the microphone 17 is converted to digital data after amplification by the audio processing circuit 84, and is subjected to data processing such as compression according to a predetermined compression recording format (such as MPEG 4) and recorded in the image storage section 132 along with the acquired image. Even in the still image imaging mode it is possible to record sounds before or after the actual imaging instruction. In addition to sounds that are recorded in the image storage section 132, various notification sound data such as data for operation sounds that are previously stored in the storage section 119, a shutter sound, and an AF focusing sound are subjected to data processing such as decoding, analog audio signal conversion, or amplification by the audio processing circuit 84, and thereafter output to the speaker 85. The speaker 85 outputs sounds in accordance with analog audio signals that are output from the audio processing circuit 84.

An RTC (real time clock) 15 outputs present date and time information. The present date and time information can be recorded as imaging date and time information of an image for recording together with the relevant image by the image pickup section 102.

An audio recognition circuit 54 performs audio recognition with respect to sounds represented by audio data that is specified from the CPU 112 among sounds that are directly acquired from the microphone 17 or audio data stored in the image storage section 132, and performs audio recognition processing that outputs the recognition result as text data. An audio database 74 is connected to the audio recognition circuit 54. Pattern data that is referred to in order to perform pattern matching when performing audio recognition processing is stored in the audio database 74. The audio recognition circuit 54 performs audio recognition by referring to the pattern data stored in the audio database 74. Various speech patterns that notify the start of imaging, such as "say cheese", "smile!", or "ready!", are registered in the audio database 74.

A GPS receiver 120 obtains information regarding the current position of the camera 10 by receiving radio waves from a GPS satellite and measuring the distance from the orbit thereof. This current position information can be stored in the image storage section 132 together with an image (for example, as meta-information or header information) as imaging position information of the image for recording by the image pickup section 102.

An infrared ray sensor 150 senses the heat of an object that exists in the vicinity of the display section 110 or the operation section 113 to thereby detect the existence of a heat generating object, and notifies the CPU 112 to that effect. A threshold value for detection can be arbitrarily set in accordance with an instruction from the CPU 112. For example, the threshold value can be set to 36° C. that is the human body temperature. The infrared ray sensor 150 may also include an image pickup element that has sensitivity in the infrared band such as a CCD. In that case, a thermal photograph may be created that takes the heat generating object as a subject.

Figure 2:
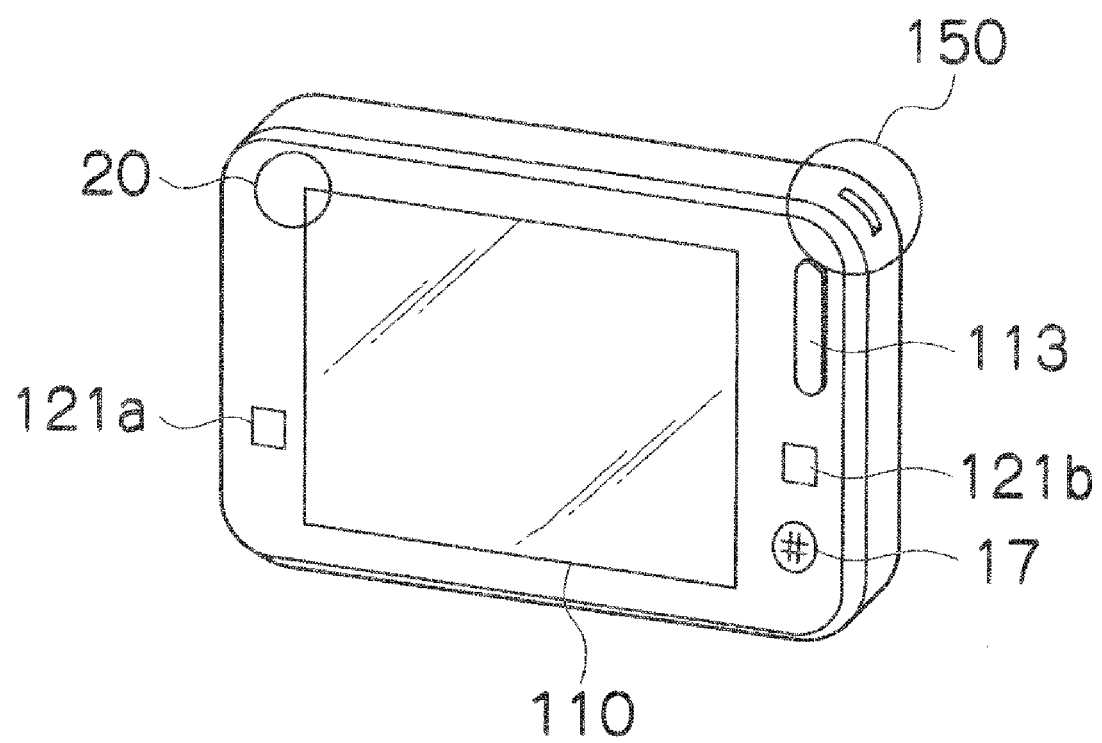
FIG. 2 is a rear view of the outer case of a camera.

FIG. 2 illustrates an example of the installation positions of the sub-image pickup section 20, the infrared ray sensor 150, the microphone 17, and a pair of electrodes 121*a* and 121*b* of a current conduction section 121 on the rear face of the outer case of the camera. These various devices are provided around the periphery of the display section 110.

Referring again to FIG. 1, the user information acquisition section 141 acquires user information that serves as a basis for image processing. Examples of the user information include positional information from the GPS receiver 120, information regarding whether a heat generating object has been detected by the infrared ray sensor 150, movement information that indicates a movement detected by the movement detection circuit 21, information regarding whether a current passing through a human body has been detected by the current conduction section 121, imaging date and time information from the RTC 15, operation contents information from the operation section 113 or the touch panel 114, composition information from the CPU 112, subject information, image quality information, and audio recognition information from the audio recognition circuit 54, or an image file in which these types of information are stored as meta-information or header information or the like.

The current conduction section 121 is provided on the outer case of the camera, and a weak electric current of a level of around several hundred microamperes is output from one of the pair of electrodes that are insulated from each other on the outer case of the camera. If both of the electrodes come in contact with a human body, the weak electric current that is output from one of the electrodes reaches the other electrode. The current conduction section 121 detects whether the weak electric current is being conducted, and outputs this as current conduction information to the CPU 112. The electrodes are arranged at portions which are normally gripped by a photographer when performing imaging with the camera 10. For example, one electrode is provided on the left side and the right side of the outer case, respectively, (in the case of vertical imaging, one electrode is provided on the top and bottom sides, respectively). The current conduction information is used as one type of information for judging whether the user holds the camera 10 in both hands and the camera 10 is in a preparatory state for imaging or the user is simply carrying the camera in one hand. This information may also be recorded as supplementary information of an image.

An image analysis section 145 analyzes an image stored in the image storage section 132, and creates and outputs composition information, subject information, and image quality information in accordance with the result. The composition information includes the information regarding the presence or absence of a human and the location of a main subject (although this typically indicates the focused subject, it may also be a subject for which face detection has been performed). The subject information includes a position and size of a facial region, a human name, and the like. Various publicly known technologies may be used for compositional analysis, subject extraction, face detection, and image quality analysis (for example, see Japanese Patent Application Laid-Open No. 2007-97090 and Japanese Patent Application Laid-Open No. 2005-354606 by the present applicant). Such information may also be recorded as supplementary information of an image.

The image quality information includes failed image information that indicates the presence or absence of defocusing and shaking, and the presence or absence of blinking. Regarding the detection of shaking, similarly to the conventional camera-shake detection, it is determined that camera shaking exists in a case in which the size of an acceleration vector detected by the movement detection circuit 21 exceeds a predetermined threshold value. Regarding detection of defocusing, detection can be performed, for example, based on edge detection (for example, see Japanese Patent Application Laid-Open No. 2005-122721 by the present applicant). Publicly known technology can also be used to determine the presence or absence of blinking (for example, see Japanese Patent Application Laid-Open No. 2007-49631 by the present applicant).

Operation contents information includes contents of operations that are input from the time of setting an imaging mode until the shutter button is half-pressed. The operation contents information is stored in the storage section 119 by the CPU 112 each time an operation is input at the operation section 113 or the touch panel 114. Such information may also be recorded as supplementary information of an image.

The image classification section 142 classifies images stored in the image storage section 132 based on information acquired by the user information acquisition section 141, and stores classification information that shows the results in the image storage section 132 in association with the respective images. The image processing conditions decision section 143 decides image processing conditions for each image based on supplementary information that is associated with the respective images, for example, composition information, operation information, positional information of the camera 10, information regarding an elapsed time until imaging, movement information of the camera 10, posture information of the camera 10, and image classification information. The image processing section 144 executes image processing on the relevant image based on the image processing conditions for the image that are decided by the image processing conditions decision section 143. The term "image processing" includes trimming, template synthesis, and text synthesis.

In this connection, the digital camera 10 may be any device that is capable of capturing a subject light as image data, and can also include a mobile phone with a camera, a personal computer with a camera, a digital video camera, a digital still camera and the like.

Character information or template data to be synthesized with image data is stored in the storage section 132, and the image processing section 144 synthesizes desired data with a desired image in accordance with a selection operation from the operation section 113.

Figure 3:
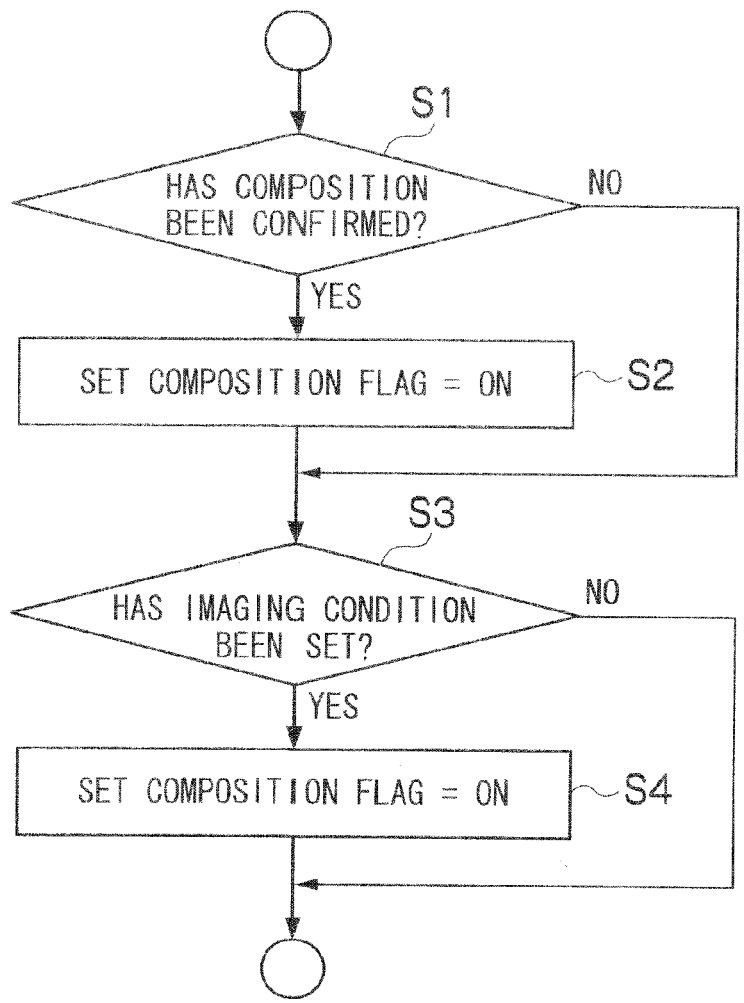
FIG. 3 is a flowchart that illustrates imaging processing according to a first embodiment.

FIG. 3 is a flowchart that illustrates an outline of imaging processing according to the first embodiment. This processing starts in accordance with the imaging mode setting. A program that causes the CPU 112 to execute this processing is stored in the storage section 119.

In S1, the CPU 112 determines whether or not an operation to confirm the composition has been detected before imaging. When the result is "Yes", the process proceeds to S2, and when the result is "No", the process proceeds to S3. In this case, a case in which the determined result is "Yes" is one in which, for example, at least any one of or all of the following conditions are satisfied: detection of a facial image from an imaging signal output from the sub-image pickup section 20 (in particular, a facial image is detected that has the same facial feature vectors as the facial feature vectors of a photographer that are previously stored in the storage section 119), detection of a heat generating object by the infrared ray sensor 150, output of current conduction information, or a condition that combines two or more of these conditions.

In S2, a "composition flag" of the storage section 119 is set to "on". At the time of imaging, if the face of the user approaches the front of the display section 110 to check a live view image or if a finger of the user is brought close to the display section 110 to perform a setting operation, it is assumed that the user is attempting to perform imaging in which importance is placed on the composition. In that case, the "composition flag" is set to "on". Conversely, when no action to check the composition is detected, it is assumed that the user is attempting to perform imaging in which importance is not placed on the composition, and therefore the "composition flag" is left in an "off" state.

In S3, the CPU 112 determines whether or not an operation that indicates that the user checks the composition prior to imaging has been input. If the determined result is "Yes", the processing proceeds to S4, and if the determined result is "No", the processing proceeds to S5. In this case, a case in which the determined result is "Yes" is one in which, for example, in addition to selection from a menu of an item that indicates checking of the composition before imaging from the operation section 113, at least any one of or all of the following conditions are satisfied: input from the operation section 113 of a predetermined operation related to composition checking, such as driving of the zoom lens, designation of a focus evaluation value calculation region, setting a face detection AF on/off, and adjustment of the screen brightness, as well as a condition that combines two or more of these conditions.

In S4, the "composition flag" of the storage section 119 is set to "on". At a time of imaging, if a user performs an operation to set various imaging conditions, such as a zoom, focus, or brightness adjustment operation, it is assumed that the user is attempting to perform imaging that places importance on the composition. In this case, the "composition flag" is set to "on". Conversely, if no operation to set an imaging condition is performed, it is assumed that the user is attempting to perform imaging that does not place importance on the composition (the user is hurrying very much, or is performing casual imaging), and thus the "composition flag" is left in an "off" state.

By recording the composition flag as supplementary information (header information, tag information, or meta-information) of an image file that records the image in question, the composition flag can be output to the electronic device 200 together with the image.

The camera 10 or electronic device 200 executes image processing with respect to the image recorded in the image file in accordance with the status of the composition flag recorded in the supplementary information of the image file.

Figure 4A:
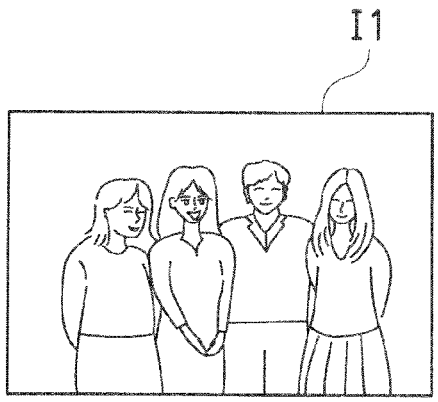
FIGS. 4A and 4B are views that show examples of images.
Figure 4B:
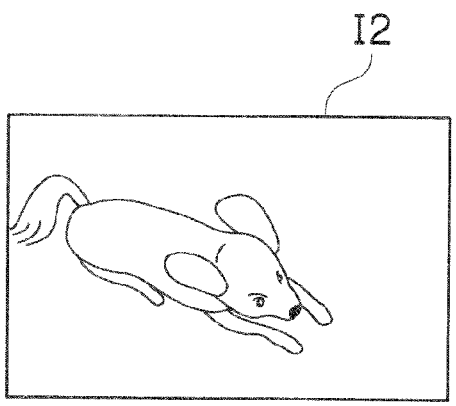

For example, it is assumed that image data I1 and I2 as shown in FIGS. 4A and 4B are recorded in certain image files.

Figure 5:
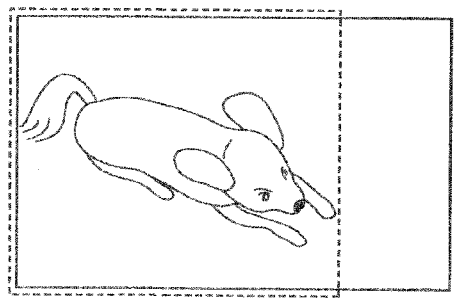
FIG. 5 is a view that shows an example of an image trimming region.
Figure 6:
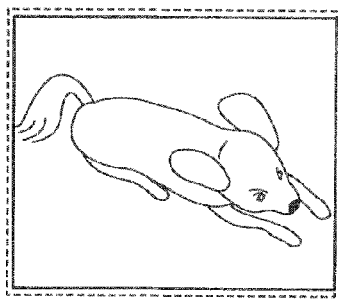
FIG. 6 is a view that shows an example of a cut-out image.

As shown in FIG. 5, when a composition flag corresponding to image data I1 is "off", after detecting a main subject by edge detection or the like, the personal computer 200a (or camera 10 or printer 200b) sets an image trimming region of an aspect ratio that includes the main subject and also corresponds to a print aspect ratio of the printer 200b for the relevant image data I1. Subsequently, as shown in FIG. 6, the personal computer 200a cuts out the image portion within the image trimming region and stores that image portion as an image for printing on a storage medium such as a hard disk. This is because it is considered that, if the composition flag is "off", the photographer does not place importance on the composition, and therefore even if the image is trimmed without necessarily maintaining the original image composition, that trimming is in accordance with the desire of the user.

In contrast, although not illustrated in the drawings, in a case where the composition flag corresponding to the image data I1 is "on", the personal computer 200a sets an image trimming region of an aspect ratio that includes a predetermined portion (typically a center portion) of the image data I1 and also corresponds to a print aspect ratio of the printer 200b, cuts out the image portion within the image trimming region, and stores that image portion as an image for printing on a storage medium such as a hard disk. This is because it is considered that, if the composition flag is "on", the photographer places importance on the composition, and therefore trimming that maintains the original image composition as much as possible is in accordance with the desire of the user.

Figure 7:
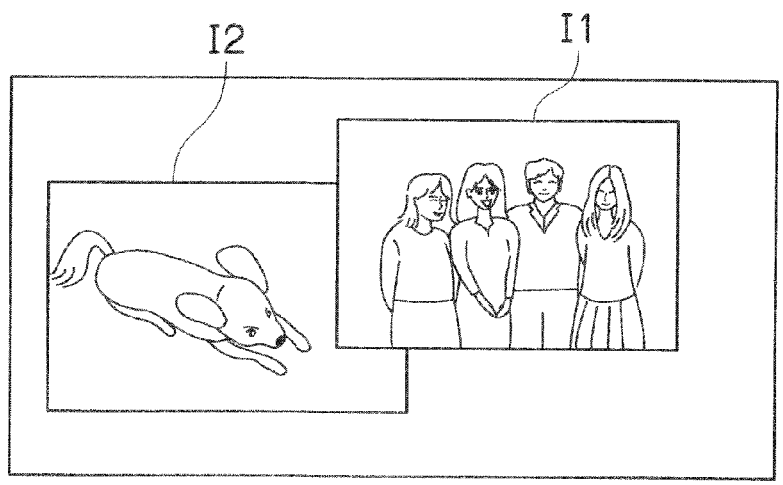
FIG. 7 is a view that shows an example of superimposed images.

Alternatively, it is assumed that, when the camera 10, personal computer 200a, or printer 200b arranges the images I1 and I2 on the same mount, overlapping of the two images occurs. In this case, it is necessary to decide which image is to be output with priority at the overlapping portion. The "composition flags" are used when making this decision. For example, if the composition flag of the image I1 is "on" and the composition flag of the image I2 is "off", output of the image I1 is given priority over the image I2 at the portion where the two images overlap (see FIG. 7).

In a case in which the composition flags of the image I1 and the image I2 are both "off", since importance is not placed on the composition for either image and a distinction cannot be made regarding the priority of either image over the other, output of an arbitrary image among the images I1 and I2 is given priority over output of the other image at the overlapping portion.

In a case in which the composition flags of the image I1 and the image I2 are both "on", since importance is placed on the composition in both images and a distinction cannot be made regarding the priority of either image over the other, a warning message prompting the user to eliminate the overlapping portion is displayed on the display section 110 or the positions of the images I1 and I2 are forcedly separated to eliminate the overlapping portion. Alternatively, a configuration may be adopted in which output of an arbitrary image among the images I1 and I2 is given priority over the other image at the overlapping portion.

Alternatively, the camera 10, personal computer 200a, or printer 200b excludes an image for which there is failed image information from print order image candidates in accordance with the composition flags of the images.

For example, when the composition flag of the image I1 is "off", even in a case in which a main subject is outside the angle of view (for example, a case in which only half of the body of the dog shown in FIG. 4B has been photographed) or in which, as the result of image analysis by the image analysis section 145, it is determined based on failed image information that so-called "failed imaging" such as defocusing, shaking, or blinking of a subject has occurred, the camera 10 does not exclude the image in question from the candidates and allows selection of the image from the operation section 113 as a print image to be output to the printer 200b.

In contrast, when the composition flag of the image I1 is "on" and it is determined that a failed imaging state has occurred, the camera 10 excludes the image in question from the candidates and disables selection of the image from the operation section 113 as a print image to be output to the printer 200b, or ignores selection thereof if the image in question is selected.

This is because, in a case in which a failed image is imaged even though the composition flag is "on" and importance is placed on the composition, it is considered that the image lacks printing value. Conversely, if the composition flag is "off" and importance is therefore not placed on the composition, even though an image has been determined as a failed image, it is considered that the image is adequate for confirming the atmosphere at the time of imaging, and therefore has printing value. Handling of an image for which there is failed image information can also be decided in accordance with a composition flag for cases other than printing, such as when excluding images from candidates for output to a CD-R or from images constituting a slideshow.

<Second Embodiment>

Figure 8:
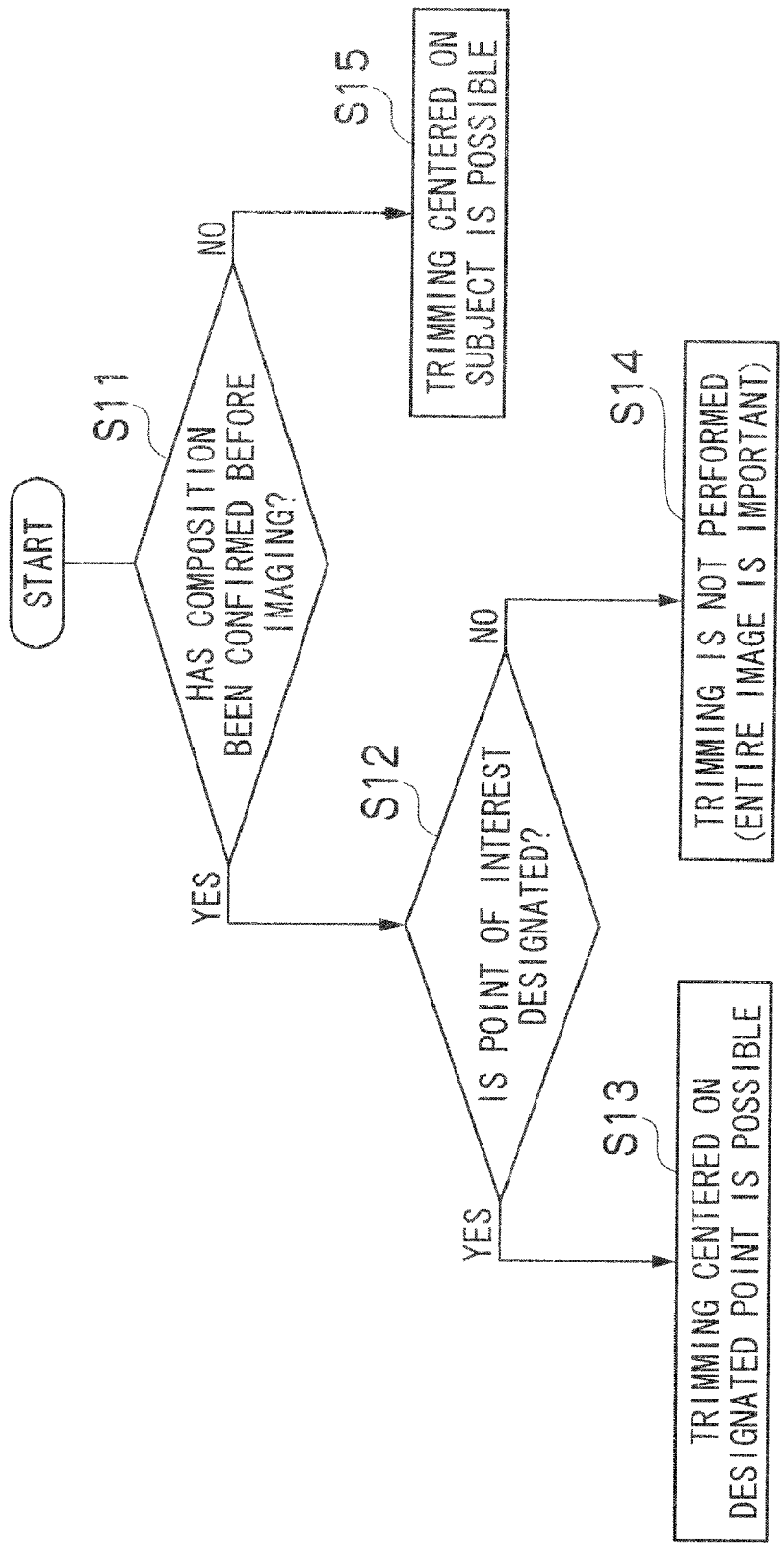
FIG. 8 is a flowchart that illustrates imaging processing according to a second embodiment.

FIG. 8 is a flowchart that illustrates an outline of imaging processing according to the second embodiment. A program that causes the CPU 112 to execute this processing is stored in the storage section 119.

In S11, the CPU 112 determines whether or not an operation to confirm the composition has been detected before imaging. When the result is "Yes", the processing proceeds to S12, and when the result is "No", the processing proceeds to S13. This processing is the same as in S1.

In S12, the composition flag is set to "on". Next, a message is displayed on the display section 110 to prompt the photographer to designate a point of interest of a desired imaging target from a live view image displayed on the display section 110, and designation of the point of interest of the imaging target is accepted from the touch panel 114. When a point of interest is designated, the processing proceeds to S13. When no point of interest is designated even though a predetermined time has elapsed or when an operation has been performed to the effect that a point of interest will not be designated, the processing proceeds to S14. A point of interest of an imaging target may be a single point or a plurality of points. A configuration may also be adopted in which, instead of accepting designation of a point of interest, an operation to plot a region that includes the imaging target or the edge of that region is accepted. For example, an operation that inputs a circle that surrounds a subject or an operation that traces over the circumference of a subject may be accepted.

In S13, a region of a predetermined shape and a predetermined size (trimming template region) that is centered on the designated point of interest is set as an image trimming region, and coordinates information of the image trimming region that is set is stored in the storage section 119. Although the trimming template region is stored in the storage section 119, a configuration may also be adopted in which the trimming template region is handled as supplementary information of an image. The shape and size of the trimming template region is arbitrary, and the region can be a circular shape, an elliptical shape, a rectangular shape, a star shape or the like. A configuration may be adopted in which the shape and size can be arbitrarily designated in advance from the operation section 113 prior to performing the imaging processing. If a point of interest is designated, a "point of interest flag" is set to "on" in the storage section 119. The flag is recorded as supplementary information of the image file.

In this connection, if an operation to plot a region that includes the imaging target or the edge of that region is performed in S13, that region is set as the image trimming region and the coordinates information of the image trimming region this is set is stored in the storage section 119. If the coordinates information of the image trimming region is recorded as header information, tag information, or meta-information of the image file in which the relevant image is recorded, the coordinates information can be output to the electronic device 200 together with the image.

It is also possible to set a region of interest or an image trimming region without depending on an explicit operation by the user to designate a point of interest at the operation section 113. For example, a configuration may be adopted which detects a user operation other than an operation at the operation section 113, and sets a region of interest or an image trimming region based thereon. More specifically, the CPU 112 detects the direction of the line of sight of the user by means of the sub-image pickup section 20, identifies a subject image or a partial region (region of interest) on a live view image that is the destination in the direction of the line of sight of the user, and sets a trimming template region of a predetermined size and a predetermined shape that includes the identified region of interest as an image trimming region. Alternatively, a configuration may be adopted in which setting of an image trimming region is not performed with the camera 10 and the coordinates information for a point of interest is recorded as supplementary information of the image, and that coordinates information is then read by the electronic device 200 to set an image trimming region. As another alternative, in a case in which the movement detection circuit 21 detects that the inclination of the camera 10 is vertically upward and the image analysis section 145 makes a face detection, it is considered that the photographer places importance on the background more than the person, and an upper region of the face detection region is set as the region of interest. Similarly, if a tilt direction is vertically downward it is sufficient to set a lower region of a face detection region as a region of interest, if a panning direction is leftward it is sufficient to set a left side region of a face detection region as a region of interest, and if a panning direction is rightward it is sufficient to set a right side region of a face detection region as a region of interest.

Alternatively, the CPU 112 detects the direction of the line of sight of the user by means of the sub-image pickup section 20, identifies a subject (subject of interest) that is the destination in the line-of-sight direction, and sets a region of a predetermined size and a predetermined shape that includes the identified subject on a live view image as a region of interest. Publicly known technology may also be used to detect a subject that the line of vision of the user is directed towards. For example, as described in Japanese Patent Application Laid-Open No. 2001-350171, it is sufficient to detect which position a photographer is looking at in the field of view of a finder.

Alternatively, an image trimming region may be set based on subject distance information and focal distance information. In this case, for example, after converting focal distance information to information regarding the distance of a focused subject, the focused subject distance information is compared with subject distance information corresponding to each subject (including subjects other than the main subject) that is separately acquired from the distance measuring section 81. Subsequently, based on the position of each subject acquired from the distance measuring section 81, the position of a subject that corresponds to the same subject distance information as the distance information of the focused subject is identified, and a region of a predetermined size and a predetermined shape that includes the focused subject and/or another subject at the same distance on the live view image is set as the region of interest. In this connection, positional information of each subject can be acquired from a 3D image if the information is three-dimensional coordinate information.

In S14, a region that includes the entire image is designated as the image trimming region. This is because, in a case where a photographer checks the composition but does not designate a particular point of interest, the entire image is important and it is not suitable to cut out a specific portion of the image. Alternatively, a configuration may be adopted in which setting of an image trimming region is not performed with the camera 10 and coordinates information for a point of interest is recorded as supplementary information of the image, and that coordinates information is then read by the electronic device 200 to set an image trimming region. Further, the "point of interest flag" is set to "off" in the storage section 119. The flag is recorded as supplementary information of the image file.

In S15, the composition flag is set to "off". Designation of an arbitrary image trimming region is subsequently accepted from the operation section 113. However, an image trimming region need not necessarily be designated. Alternatively, a configuration may be adopted in which setting of an image trimming region is not performed with the camera 10, information indicating that an image trimming region is "none" is recorded as supplementary information of the relevant image, and that information is read by the electronic device 200 to allow free setting of an image trimming region by a user operation.

Figure 9A:
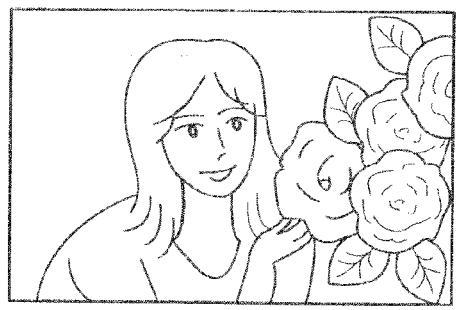
FIGS. 9A, 9B, and 9C are views that show examples of a live view image and a point of interest.
Figure 9B:
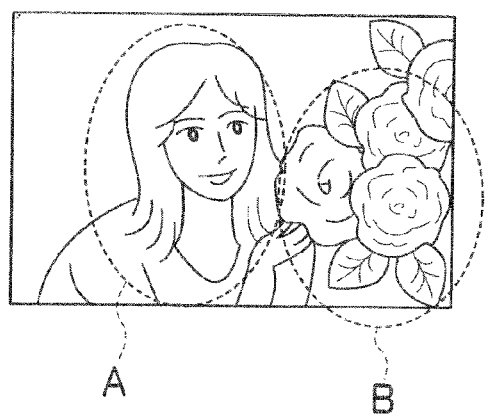
Figure 9C:
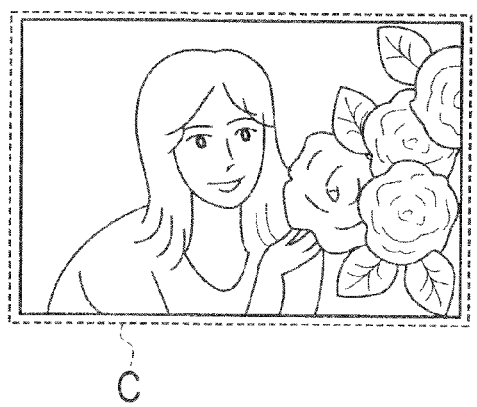

FIGS. 9A to 9C illustrate examples of a live view image and a point of interest. In FIG. 9A, no composition confirmation has been performed ("No" at S11), it is considered that there is no particular point in which the user is interested, and a trimming region is also not set (S15). In FIG. 9B, a composition confirmation has been performed ("Yes" at S11), and points of interest are designated at the human subject in the center of the screen and at the right side of the screen. Therefore, two image trimming regions A and B corresponding to the points of interest are set. In FIG. 9C, although a composition confirmation has been performed ("Yes" at S11), a point of interest has not been designated ("No" at S12). More specifically, the user considers the entire screen to be a point of interest and the region including the entire image is designated as an image trimming region C, and thus trimming of one part of the image is prevented.

The camera 10, personal computer 200a, or printer 200b (hereunder, expressed as "camera or the like") sets an image trimming region according to whether or not a composition confirmation operation is performed and whether or not a point of interest is designated, and trims image data in accordance with the image trimming region.

More specifically, a processing contents table as shown in FIG. 10 that defines the contents of image processing for each of the merchandizing materials corresponding to the execution results of the respective processing in steps S3, S4, and S5 is stored in the storage section 119 or another recording medium of the camera or the like, and processing contents that correspond to the processing proceeded to as the result of the decisions in S1 and S2 as well as the desired print type are specified and executed. In this connection, because setting contents of a trimming region are defined in this table, it is not always necessary for the camera 10 itself to set a trimming region or control playback of a moving image at steps S13, S14, and S15, and the electronic device 200 can refer to the composition flag or point of interest flag of the image file to determine a trimming region.

For example, in a case in which "normal print" is selected as the print type and the processing has proceeded to step S15 (i.e. a case where supplementary information of the image file records that the "composition flag" is "off"), with respect to the image recorded in the relevant image file, the camera or the like aligns (centers) the center of a rectangular region having an aspect ratio of a normal print with the center of the image, and cuts out a portion of the image that is included in the rectangular region. This is because, unless a detailed confirmation of the composition, such as confirming the balance between the background and a person, is performed before imaging, it is considered that it is not a problem even if the background is clipped and trimmed to a certain extent.

Alternatively, when "photo album or the like (photo album, calendar, postcard)" is selected as the print type and the processing has proceeded to step S15, with respect to the image recorded in the relevant image file, the camera or the like accepts free setting of an image trimming region via the operation section 113 or another user operation member, and cuts out an image portion that includes the accepted region.

Alternatively, when "normal print" is selected as the print type and the processing has proceeded to step S13 (i.e. a case where supplementary information of the image file records that the "composition flag" is "on" and the "point of interest flag" is "on"), with respect to the image recorded in the relevant image file, the camera or the like cuts out a region in the vicinity of the point of interest, for example, an image portion that includes the aforementioned region of interest. In this connection, it is better that a synthesis position of supplementary information such as a date and time is a position that is away from the point of interest.

Figure 11:
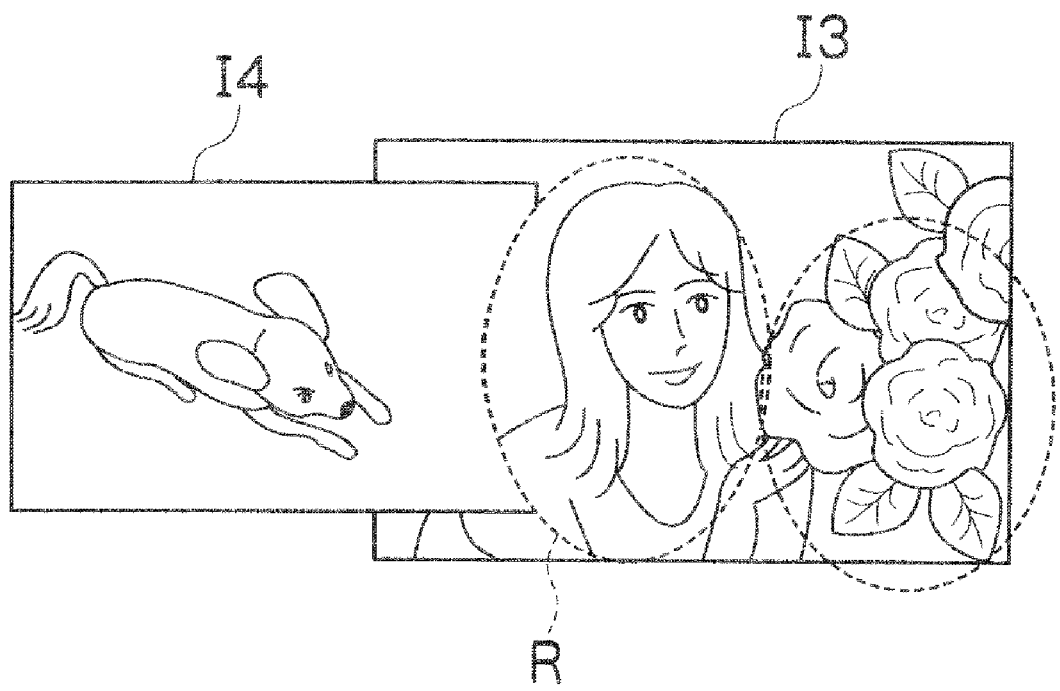
FIG. 11 is a view that shows an example of images that have been superimposed so as to avoid a region of interest.

Alternatively, when "photo album or the like (photo album, calendar, postcard)" is selected as the print type and the processing has proceeded to step S13, with respect to the image recorded in the relevant image file, the camera or the like cuts out an image portion that includes the aforementioned region of interest. Alternatively, in a case in which a region of interest of an image overlaps with another image that is on the same mount, the region of interest is given the priority for output. In FIG. 11, although a region of interest R of an image I3 overlaps with an image I4, the region of interest R is output to the front with priority over the image I4, and the image I4 is to the rear of the image I3 with respect to the region of interest R. When displaying a slideshow with these images I3 and I4, although the images may be caused to fade-in and fade-out on the screen, in a case where the two images overlap at that time, output priority control as described above is performed with regard to the overlapping portion.

Alternatively, when "normal print" is selected as the print type and the processing has proceeded to step S14 (i.e. a case where supplementary information of the image file records that the "composition flag" is "on" and the "point of interest flag" is "off"), the camera or the like accepts a designation of an arbitrary image trimming range with respect to the image recorded in the relevant image file from an operation member of the operation section 113. However, in a case where the accepted image trimming range is a range such that a predetermined proportion or more of the area of the entire image is lost (for example, a case where an image trimming range is designated such that 30% or more of the area of the entire image is lost), a warning indicating that the cut-out region is small is output to a display device such as the display section 110, and as large a region as possible is cut out. This is because it is considered that since the photographer carefully checked which type of image would be taken before actually taking the image, large-scale trimming is considered undesirable. In this connection, it is better that supplementary information such as an imaging date and time that is output together with the image is synthesized at a position that is away from the point of interest.

Alternatively, when "photo album" is selected as the print type and the processing has proceeded to step S14, the camera or the like accepts an instruction to arrange the entire image as it is on a mount, so that the entire image is retained. In this connection, when the entire image is arranged on a mount, a cover sheet, or two facing pages, the entire image will be favorably prominent.

Control of the order of priority for image output can be performed by allocating a layer (virtual image layer) to each image. Accordingly, in addition to the actual print output, a point of interest can also be used as a control criterion for the order of priority for a screen display.

For example, it is assumed that playback of image data recorded in a moving image file is specified in a case in which the supplementary information of the relevant image file records that the "composition flag" is "off". In this case, although the CPU 112 displays a video image in accordance with the image data on the display section 110, at that time the CPU 112 permits cutting out of a required portion in the image and also permits superimposition with respect to another image displayed on the screen. As a result, playback is performed in a state in which only a portion of the moving image to be played back has been cut out, or the moving image that is hidden under the other image is played back. A motion (effect) may also be imparted to the source image, such as by hiding (masking) the cut-out region or a region other than the cut-out region, or by synthesizing images so as to emphasize the cut-out region (synthesized frame), or by rotating the cut-out region. A configuration may also be adopted that allows free selection from the operation section 113 of a song title of "background music (BGM)" to be output to the speaker 85 from the audio processing circuit 84 and played back in synchronization with the effect.

When the "composition flag" is "on" and the "point of interest flag" is "on" in the supplementary information of the image file, a motion (effect) may also be imparted to the source image, such as displaying a region of interest of the image of the relevant image file so as to move (pan or tilt) horizontally or vertically at a predetermined speed, enlarging/contracting (zoom-in/zoom-out), hiding (masking) a region other than a region of interest, synthesizing images so as to emphasize the region of interest (synthesized frame), or rotating a region of interest. When there are multiple points of interest, the display may be switched from a certain region of interest to another region of interest as in a slideshow. A configuration may also be adopted in which the type of effect can be freely selected from the operation section 113. Further, a configuration may be adopted in which a song title of "background music (BGM)" to be played back in synchrony with the effect can be freely selected from the operation section 113.

When the "composition flag" is "on" and the "point of interest flag" is "off" in the supplementary information of the image file, an image of the relevant image file is played back in synchrony with playback of a specific musical composition that is a constituent portion of the "background music (BGM)", for example, a specific melody or bridge portion. An image other than the relevant image is not displayed, and only the image whose entire area is of interest is displayed exclusively on the display section 110. In order to show the entire image, it is preferable not to perform effects that hinder the image display, such as masking or a synthesized frame.

When there is a plurality of image files, first selection of a desired BGM from a plurality of different types of BGM stored in the storage section 119 is accepted by the operation section 113. Further, selection of an image that it is desired to playback in synchrony with the BGM from images stored in the image storage section 132 is accepted by the operation section 113.

Subsequently, when playback of an image is instructed, playback of the selected image starts in synchrony with playback of the selected BGM. A selection regarding which image to associate with which constituent portion of the BGM for playback is arbitrary, and for example a configuration can be adopted as described in Japanese Patent Application Laid-Open No. 2008-65153. In this connection, since extraction of a specific melody or bridge portion can be performed using publicly known technology, an image for which a "composition flag" is "on" and a "point of interest flag" is "off" can also be played back at the same time as a specific musical composition portion, particularly a bridge.

Further, although not illustrated in FIG. 10, in a case of extracting (capturing) a still image from a moving image and printing out or storing that still image, S11 to S15 can be executed for that captured image. For example, when an action to confirm the composition, such as viewing the display section 110, is detected prior to imaging at S11, it is recorded that the "composition flag" is "on" in the supplementary information of the moving image. In this case, the image processing section 144 (or CPU 112) sets a trimming range to be applied to the captured image that is centered on the main subject. This type of trimming range may also be set in a case in which it is recorded that the "composition flag" is "on" and/or a motion at the time of imaging is less than a predetermined threshold value ("Yes" at S26 that is described later).

<Third Embodiment>

Images may be classified in accordance with a time that elapses until imaging or in accordance with movements detected by the movement detection circuit of the camera 10 until imaging, and image processing in accordance with the classification may be performed by the camera 10 or the electronic device 200.

For example, a classification table as shown in FIG. 12 is stored in the storage section 119 or the electronic device 200, user information acquired by the user information acquisition section 141 until an imaging instruction operation of each image stored in the image storage section 132 is referred to, and classification is performed that corresponds to conditions that conform with the relevant user information.

Figure 13:
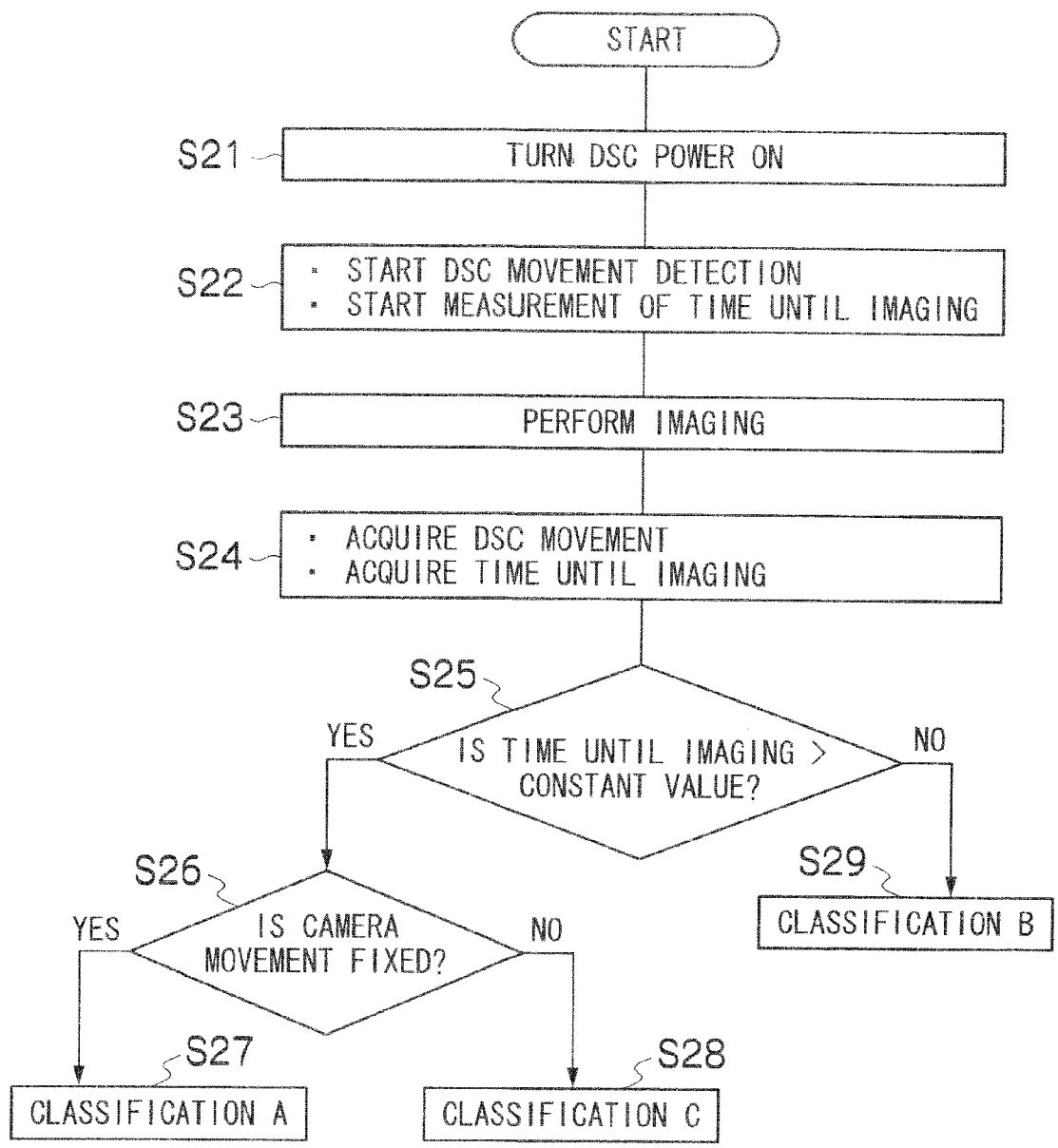
FIG. 13 is a flowchart that illustrates image classification processing according to the second embodiment.

FIG. 13 is a flowchart that illustrates image classification processing according to the third embodiment. A program that causes the CPU 112 to execute this processing is stored in the storage section 119.

In S21, the supply of power to each block is started in response to the power button of the operation section 113 being turned on.

In S22, movement detection by the movement detection circuit 21 starts and current time information output from the RTC 15 is also acquired, and this information is stored in the storage section 119 as a movement detection start time. However, movement detection may be paused during a period in which positional information output by the GPS receiver 120 is changing or in a case where there is no current conduction information. This is because, in such a case, movements are detected because the photographer is merely wandering around and not because the photographer is deciding the composition, or unwanted movement detection is performed even though the photographer is not preparing the camera 10 with the intention of taking an image.

In S23, imaging preparation operations such as AF/AE are performed in response to the release switch of the operation section 113 being half-pressed. Further, in response to the release switch being fully pressed, an image is stored in the image storage section 132.

In S24, current time information output from the RTC 15 is acquired together with ending of movement detection by the movement detection circuit 21, and this information is stored in the storage section 119 as a movement detection end time. Alternatively, user information that includes a movement detection start time, a movement detection end time, and the contents of detected movements is stored in the image storage section 132 together with the image data as supplementary information of the image file.

In S25, the CPU 112 determines whether or not a time interval from a detection start time until a movement detection end time is longer than a predetermined threshold value T1 (for example, 10 minutes). If the result is "Yes", the processing proceeds to S26, and if the result is "No", the processing proceeds to S29.

In S26, the CPU 112 determines whether or not a movement, for example, a rotation or a vibration, was detected during the period from S22 to S24. If the result is "Yes", the processing proceeds to S27, and if the result is "No", the processing proceeds to S28. In this case, if there is no current conduction information even though a movement is not detected, it is considered that the photographer takes an image arbitrarily without the intention of carefully adjusting the composition or that an image is taken due to an erroneous operation, and therefore the processing may proceed to S28.

In S27, classification information "classification A" is recorded as supplementary information of the image that is taken at S23.

In S28, classification information "classification C" is recorded as supplementary information of the image that is taken at S23.

In S29, classification information "classification B" is recorded as supplementary information of the image that is taken at S23.

The method of classification is not limited to the method described above. For example, the CPU 112 records the classification information "classification A" as supplementary information of an image that is imaged in a case in which speech of specific contents such as "say cheese" is recognized by the audio recognition circuit 54 after setting the imaging mode or in a state in which a subject reacts to that speech and maintains a specific facial expression (smiling face or the like). In this connection, detection of a specific facial expression can be implemented with publicly known technology (for example, see Japanese Patent Application Laid-Open No. 2007-288382 by the present applicant).

Alternatively, a configuration may be adopted in which the CPU 112 records the classification information "classification B" as supplementary information only when the CPU 112 determines "No" in S25 and a pressing force on the release switch is equal to or greater than a predetermined threshold value, or a movement in a vertical or horizontal direction is equal to or greater than a predetermined threshold value, and in other cases the CPU 112 proceeds to S28 and records "classification C". This is because, when a pressing force is strong or, alternatively, when the camera 10 moves to a large degree, it is considered that the photographer takes an image in an extreme hurry with little time to adjust the composition. Further, "classification B" may also be recorded for images that are taken by a manual operation or that are taken continuously in a continuous-exposure mode.

For classification A, it is assumed that an image is taken by the photographer after taking a comparatively long time to carefully decide the composition without moving almost at all. For classification B, it is assumed that an image is taken by the photographer immediately, without taking much time to decide the composition. For classification C, it is assumed that an image is taken by the photographer after taking a comparatively long time to decide the composition, although not as long as in the case of classification A.

However, it is not necessary to perform all of the steps using the camera 10, and S25 and thereafter can also be performed with the electronic device 200 by referring to supplementary information for each image that is received from the camera 10. That is, in this case, the electronic device 200 refers to the user information of the image file to execute step S25 and the steps thereafter.

When only performing S21 to S24 with the camera 10, a configuration may be adopted in which, after S24 ends, the CPU 112 returns to S22 to store the time at which the preceding imaging has finished in the storage section 119 as the movement detection start time for the next imaging, and S22 to S24 are repeated each time the photographer takes an image.

The camera 10 may also be provided with an image extraction and selection device that retrieves and extracts classified images from the storage section 119 and outputs a video of the images to the display section 110. For example, the image extraction and selection device accepts selection of one (or more than one) classification among the classification options "composition important", "momentary timing", and "other" from the operation section 113. If the option "composition important" is selected, the image extraction and selection device outputs images classified as classification A, if the option "momentary timing" is selected the image extraction and selection device outputs images classified as classification B, and if the option "other" is selected the image extraction and selection device outputs images classified as classification C to the display section 110. If a plurality of options is selected, the image extraction and selection device combines images of each of the corresponding classifications and outputs the images to the display section 110. The image extraction and selection device can also allow a user to select a desired image from among displayed images through the operation section 113, and output the selected image to the electronic device 200. That is, images to be utilized can be narrowed down in accordance with the classifications.

Further, although not illustrated in FIG. 13, when extracting (capturing) a still image from a moving image and printing out or storing that still image, the processing of S21 to S28 can be executed for that captured image. For example, if "camera movement"="Yes" is recorded as supplementary information of the moving image, a trimming range for the captured image is set that is centered on the main subject. Alternatively, if "camera movement"="Yes" and/or it is detected by the sub-image pickup section 20 that the photographer is viewing the subject directly up to the time of performing imaging preparation operations, the aforementioned type of trimming range may also be set. This is because, since time is taken to decide the composition and/or imaging is performed after paying attention to the subject, it is considered that it is preferable to omit the background when utilizing the captured image.

FIGS. 14A to 14E show examples of images. As shown in FIG. 14A, in an image in which the subjects are lined up and which is imaged at the optimal timing (when someone shouts "say cheese" or when the subjects are smiling), the composition is important. When taking this type of image, it is normal that a considerable period of time elapses before the photographer starts to take an image while the camera 10 is not moved to a great extent and that there is a shout to inform the subjects of the timing for imaging, and hence it is likely that the results at S25 and S26 will both be "Yes" and classification A will be assigned to the image.

For an image that is taken at a moment in which something occurs, such as a pet running as shown in FIG. 14B, or a child falling down, a car moving during a race, or a dolphin jumping at a dolphin show, the composition is not important or there is no time to check the composition, and it is therefore normal that the subject is misaligned with respect to the center to some degree to the left or right or that defocusing, shaking, or misalignment of the angle of view occurs. In this case, it is considered that as long as the important subject has been imaged to a reasonable degree, the photographer permits some degree of poorness in the composition. For this type of image, it is likely that the result at S25 will be "No" and classification B will be assigned to the image.

As shown in FIG. 14C, for an image which is casually taken by the photographer without worrying about the subject or location, it is likely that the result at S25 will be "Yes" and the result at S26 will be "No" and classification C will be assigned to the image.

Although the images shown in FIG. 14D and FIG. 14E are images of the same subject, both images will not necessarily be assigned the same classification. As shown in FIG. 14D, for an image in which a large image of the subject is taken in the center, it is considered that the photographer took time to decide the composition, and therefore it is likely that the results at S25 and S26 will both be "Yes" and classification A will be assigned to the image. As shown in FIG. 14E, for an image in which the photographer casually captures a subject at a distance, it is likely that the result at S25 will be "Yes" and the result at S26 will be "No" and classification C will be assigned to the image.

Since an image with classification A is considered to be important to the photographer, for example, that image is subjected to the same processing as an image for which the supplementary information of the image file shows that the "composition flag" is "on" and the "point of interest flag" is "on", and when an excessively small trimming range is set, a warning is emitted or, alternatively, the image is printed or played back without performing any particular trimming or the like.

Since an image with classification C is considered to be not very important to the photographer, for example, the image is excluded from candidates for print output or other processing, or is arranged at a peripheral position that is away from the main position (vicinity of the center or the like) for template synthesis, photo albums, moving image playback and the like. Alternatively, a limit is not established with regard to setting an image trimming range so that the user can freely cut out a portion from any area of the image.

For an image with classification B, if the photographer repeatedly takes images of the same subject continuously from the camera 10, a print in which the subject is imaged by means of fixed point observation or a synthesized video image can be created from the obtained plurality of images.

Figure 15:
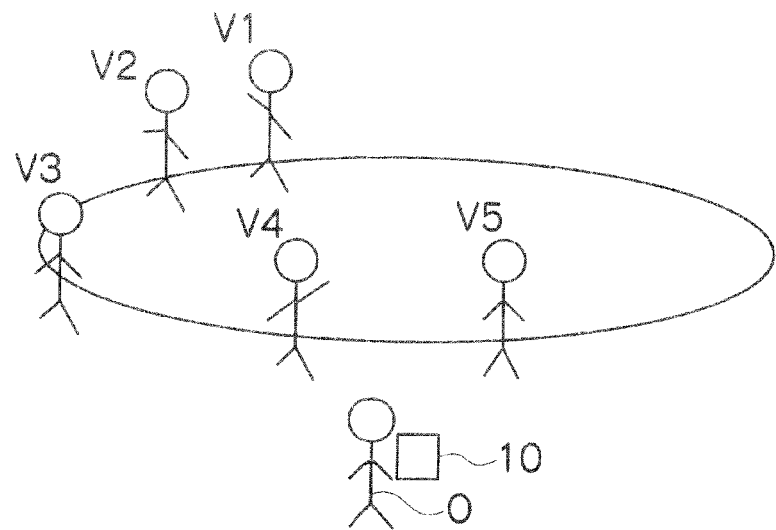
FIG. 15 illustrates a situation in which a photographer using the camera takes images of the same subject from the same spot.

For example, as shown in FIG. 15, it is assumed that, using the camera 10, the photographer takes continuous images from a fixed point O of the same subject that moves to respective positions V1 to V5, to thereby obtain images I1 to I5 (still images or frame images of a moving image).

When taking images of the subject at the respective positions V1 to V5, the CPU 112 of the camera 10 calculates a position (point of regard) at XYZ coordinates of the focused subject based on an inclination in a pan direction or a tilt direction of a camera and a distance from the fixed point O to the focused subject (obtained by converting focal distance information to distance information as described above), for example, based on XYZ coordinates in which the ground level is taken as a plane which forms XY axes (X axis is parallel to the latitude direction, Y axis is parallel to the longitude direction) and a vertically upward direction from the ground level is taken as the Z axis, as reference coordinates that take the fixed point O as an origin.

Figure 16:
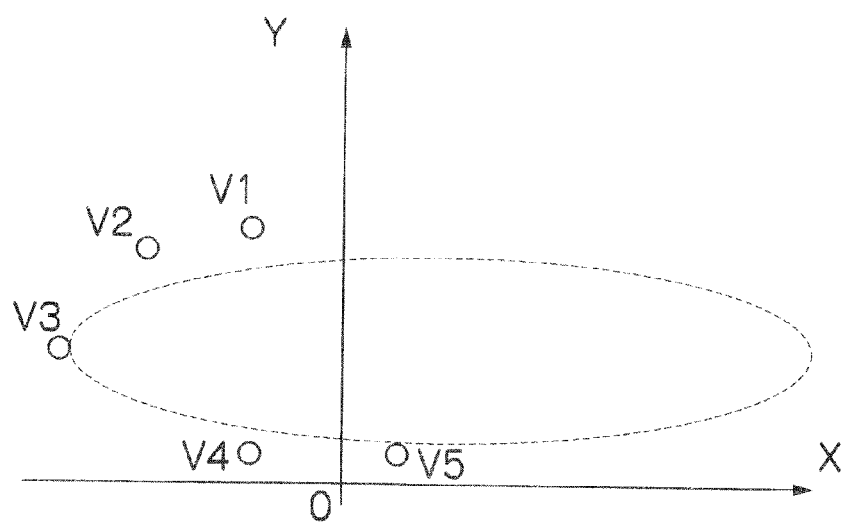
FIG. 16 illustrates an example of a point of regard that is positioned at coordinates.

FIG. 16 shows an example of the point of regard. In this case, since the subject moves around a planar track and there is no fluctuation in the Z-axis direction, an illustration of the Z axis is omitted. However, if the subject makes a spatial movement, that information is naturally reflected in the point of regard.

The CPU 112 associates each point of regard with a captured image (or a substitute thereof; for example, identification information such as a file name) at each of the positions V1 to V5 and current time information that is output from the RTC 15 at each imaging time, and stores this information in the storage section 119 as subject imaging time and position information that is one type of user acquisition information. The subject imaging time and position information may also be recorded as supplementary information of the respective images.

Figure 17:
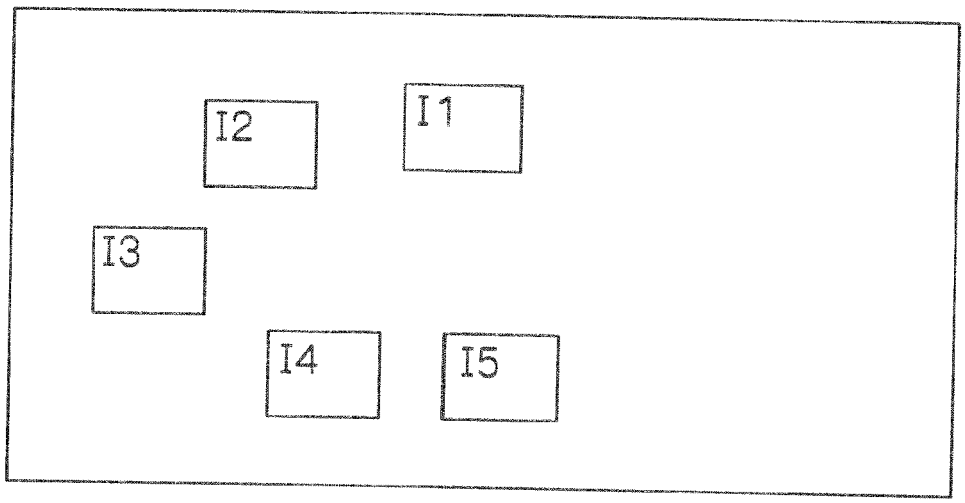
FIG. 17 shows an example of images arranged on a mount according to point of regard coordinates.

The image processing section 144 arranges images corresponding to each point of regard on a mount in accordance with the subject imaging time and position information. For example, as shown in FIG. 17, the positional relationship between each point of regard V1 to V5 on the XY plane is reflected as it is in the spatial layout of images I1 to I5 corresponding to each point of regard on a single mount. This is achieved by orthogonally projecting each point of regard onto a planar coordinate system called a "mount".

In the case of a mount with respect to which a quasi-three dimensional coordinate system such as a lenticular print has been introduced, a quasi-three dimensional print can be realized by converting the points of regard into a parallactic image.

Alternatively, in addition to outputting images that are arranged on a mount to the printer 200b, the CPU 112 or the image processing section 144 may convert the images to a video signal and output the video signal to the display section 110.

<Fourth Embodiment>

Information about the current position of the camera 10 when taking each image that is assigned with classification A or classification B may also be reflected in the layout of images on a mount.

The CPU 112 associates positional information (imaging position information) obtained from the GPS receiver 120 when the release button is fully depressed with a captured image (or a substitute thereof; for example, identification information such as a file name) that is imaged at that time and current time information that is output from the RTC 15 at each imaging time, and stores this information in the storage section 119 as photographer imaging time and position information that is one type of user acquisition information. The photographer imaging time and position information may also be recorded as supplementary information of the respective images.

Figure 18:
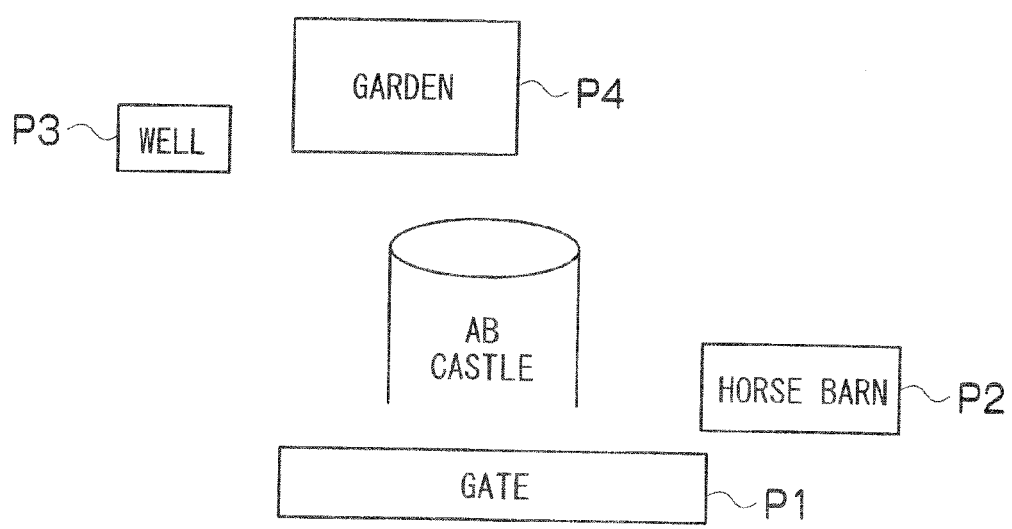
FIG. 18 shows one example of imaging position information.

For example, as shown in FIG. 18, when it is assumed that the photographer using camera 10 performs imaging each time the photographer moves to the respective positions P1 to P4 and thereby obtains the respective images I1 to I4 (still images or frame images of a moving image), P1 to P4 constitute the imaging position information.

Figure 19:
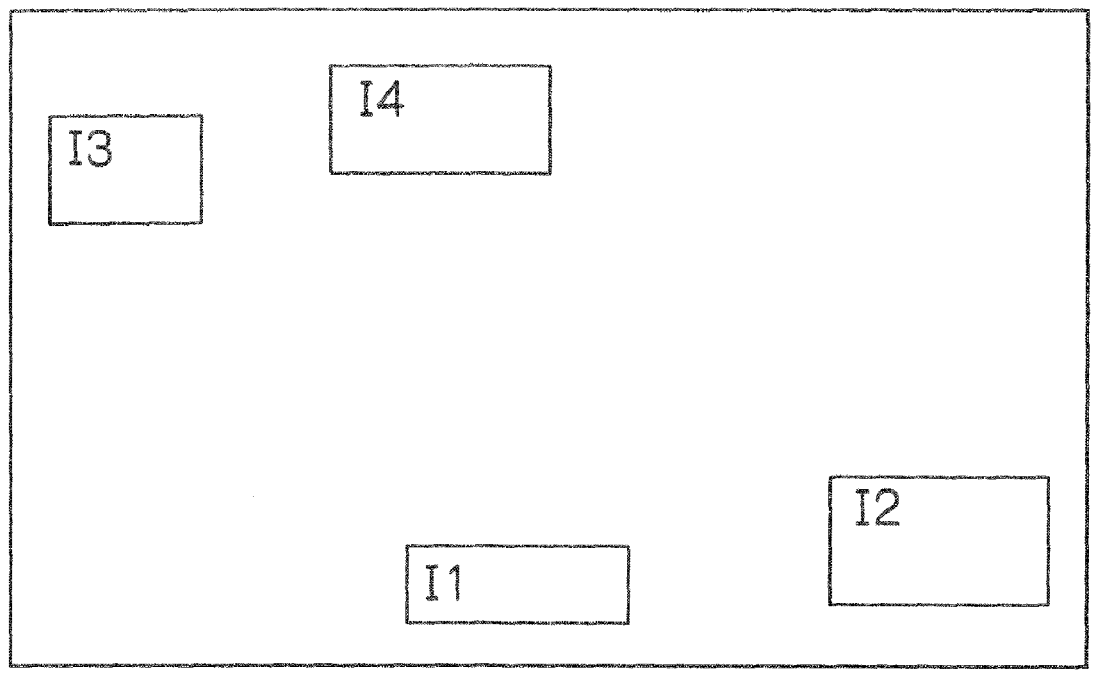
FIG. 19 shows an example of images arranged on a mount in accordance with imaging position information.

The image processing section 144 arranges images corresponding to each item of imaging position information on a mount in accordance with the photographer imaging time and position information. For example, as shown in FIG. 19, the positional relationship between P1 to P4 is reflected as it is in the spatial layout of images I1 to I4 corresponding to the respective items of imaging position information on a single mount. This is achieved by orthogonally projecting each item of photographer imaging time and position information onto a planar coordinate system called a "mount".

In the case of a mount with respect to which a quasi-three dimensional coordinate system such as a lenticular print has been introduced, a quasi-three dimensional print can be realized by converting the imaging position information into a parallactic image.

Alternatively, in addition to outputting images that are arranged on a mount to the printer 200b, the image processing section 144 may convert the images to a video signal and output the video signal to the display section 110. In a case where images are taken in a particular location (an enclosed space such as a castle or an amusement park), a background template that shows a panoramic view of that location may also be synthesized onto the mount.

<Other Embodiments>

The composition flag, point of interest flag, and point of interest coordinates information of both the first and second embodiments and the classification information of the embodiment can be associated with the relevant image data for recording. In that case, the processing of any of FIG. 3, FIG. 8, and FIG. 12 can be performed. Further, an image to be subjected to the aforementioned processing may also be an analog image recorded on a film, and not just an image recorded as digital image data. It is sufficient to record the supplementary information in a supplementary information recording section that magnetically or optically records the supplementary information in correspondence with the respective image frames, such as an ASP film. When performing the processing of FIG. 3, FIG. 8, and FIG. 12 with the electronic device 200, digital images and analog images may be mixed as images that are the object of processing.

Figure 20:
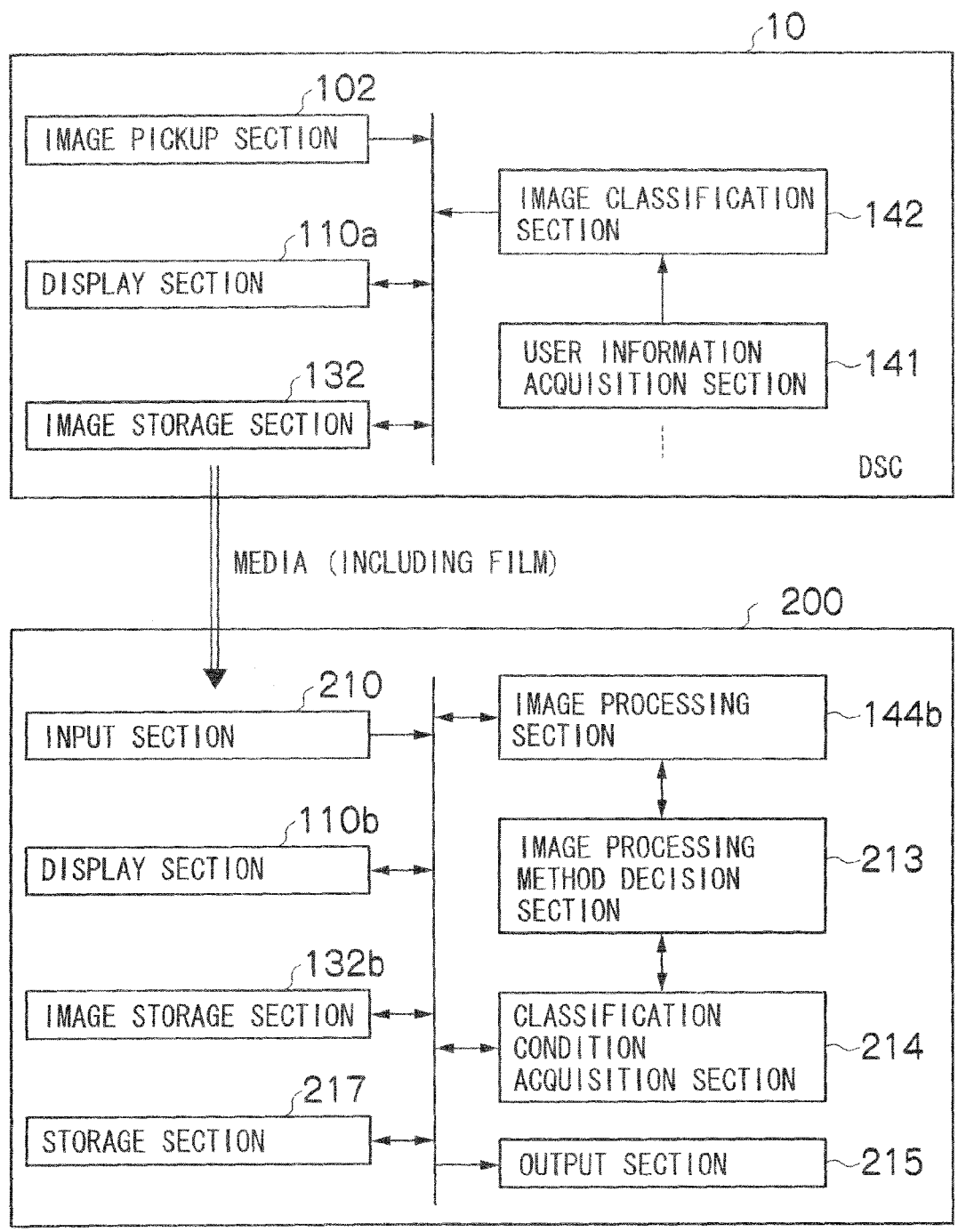
FIG. 20 shows an example of the configuration of an electronic device.

As shown in FIG. 20, to perform these types of processing, the electronic device 200 includes an input section 210, a display section 110b, a storage section 217, an image storage section 132b, an image processing section 144b, an image processing method decision section 213, a classification condition acquisition section 214, and an output section 215. The display section 110b, image storage section 132b, and image processing section 144b have an equivalent configuration to the similar components in the camera 10 shown in FIG. 1. The classification condition acquisition section 214 acquires the composition flag, point of interest flag, and point of interest coordinates information of the first and second embodiments from an image file recorded on a portable recording medium (image storage section 132) or from a supplementary information recording section of an ASP film. It is not necessary for the portable recording medium (image storage section 132b) to be an accessory of the camera 10, and it may be a medium that records images acquired with another electronic device, for example, a mobile phone with a camera, a personal computer with a camera, or a PDA with a camera.

Further, the processing contents table shown in FIG. 10 and the classification table shown in FIG. 12 are stored in the storage section 217. A configuration may also be adopted in which these tables are input and stored from the input section 210. A program that defines the above described processing is stored in the storage section 217.

The image processing method decision section 213 interprets and executes the program to perform processing equivalent to that of the camera 10 for each image input to the input section 210, such as setting an image trimming region and assigning classification information.

By configuring the electronic device 200 in this manner, it is also possible to set an image trimming region or assign classification information at a device other than the camera 10.

What is claimed is:

1. An information processing apparatus, comprising:
    a photographer information acquisition section which acquires photographer information that is information relating to actions of a photographer before starting to take an image;
    a processing contents decision section which decides contents of processing with respect to the image based on the photographer information that is acquired by the photographer information acquisition section; and
    a failed image determination section which determines whether or not the image is an image with respect to which imaging has failed,
    wherein the photographer information includes at least one member of the group comprising whether to perform a composition confirmation, whether to perform an imaging preparation operation, a position of an imaging device, an elapsed time until starting to take an image, and a movement of an imaging device until starting to take an image,
    wherein in a case where the photographer information includes information indicating that a composition confirmation is performed, the processing contents decision section sets an image processing range of a predetermined aspect ratio based on a predetermined position in the image, and in a case where the photographer information includes information indicating that a composition confirmation is not performed, the processing contents decision section sets an image processing range of a predetermined aspect ratio based on a main subject in the image; and
    wherein in a case where the photographer information includes information indicating that a composition confirmation is performed and the failed image determination section determines that the image is a failed image, the processing contents decision section excludes the image from candidates for which processing contents are decided.

2. The information processing apparatus according to claim 1, wherein the image processing range includes a trimming range or an image synthesis range.

3. The information processing apparatus according to claim 1, wherein the information indicating that a composition confirmation is performed includes detection of an eye-line to a display screen of an imaging device, detection of a human body in a vicinity of the imaging device, audio recognition of specific contents, a specific posture of the imaging device, and detection of an operation to input an imaging condition, such as a zoom operation, a focus operation, or a brightness adjustment operation.

4. The information processing apparatus according to claim 1, further comprising:
    a portion of interest decision section which decides a portion of interest of an image,
    wherein the processing contents decision section decides contents of processing with respect to the image based on a portion of interest of the image that is decided by the portion of interest decision section.

5. The information processing apparatus according to claim 4, further comprising:
    a portion of interest designation section which accepts a designation of a portion of interest of an image,
    wherein the processing contents decision section decides contents of processing with respect to the image based on a portion of interest of an image for which a designation is accepted by the portion of interest designation section.

6. The information processing apparatus according to claim 4, wherein the portion of interest decision section decides as a portion of interest at least one of a focused subject and a subject that is at a same distance as a distance to the focused subject from an imaging device.

7. The information processing apparatus according to claim 4, further comprising:
    a subject of interest identification section which identifies a subject to which the photographer is paying attention,
    wherein the portion of interest decision section decides that a subject identified by the subject of interest identification section is a portion of interest.

8. The information processing apparatus according to claim 1, further comprising:
    a classification section which assigns a classification to the image based on photographer information acquired by the photographer information acquisition section,
    wherein the processing contents decision section decides contents of processing with respect to the image based on a classification that is assigned to the image by the classification section.

9. The information processing apparatus according to claim 1, further comprising:

a processing section which processes the image in accordance with processing contents that are decided by the processing contents decision section.

10. The information processing apparatus according to claim 9, wherein the processing includes at least one of trimming, arranging an image on a mount, synthesizing images, and imparting an effect to an image.

11. A computer-executable information processing method for execution by a computer, wherein the computer performs the steps of:

acquiring photographer information that is information relating to actions of a photographer before starting to take an image; and deciding contents of processing with respect to the image based on the photographer information; and determining whether or not the image is an image with respect to which imaging has failed, wherein the photographer information includes at least one member of the group comprising whether to perform a composition confirmation, whether to perform an imaging preparation operation, a position of an imaging device, an elapsed time until starting to take an image, and movement of an imaging device until starting to take an image, wherein in a case where the photographer information includes information indicating that a composition confirmation is performed, a step is performed to set an image processing range of a predetermined aspect ratio based on a predetermined position in the image, and in a case where the photographer information includes information indicating that a composition confirmation is not performed, a step is carried out that sets an image processing range of a predetermined aspect ratio based on a main subject in the image, and wherein in a case where the photographer information includes information indicating that a composition confirmation is performed and the image is determined to be a failed image, a step is performed to exclude the image from candidates for which processing contents are decided.

12. A computer program product stored on a non-transitory computer readable medium, the product comprising computer-executable instructions for causing a computer to execute the information processing method according to claim 11.

\* \* \* \* \*